June 26, 1923.

F. M. CASE

FISHING REEL

Filed April 29, 1920

1,460,151

3 Sheets-Sheet 1

INVENTOR
Francis M. Case
BY Brockett & Hyde
ATTORNEYS

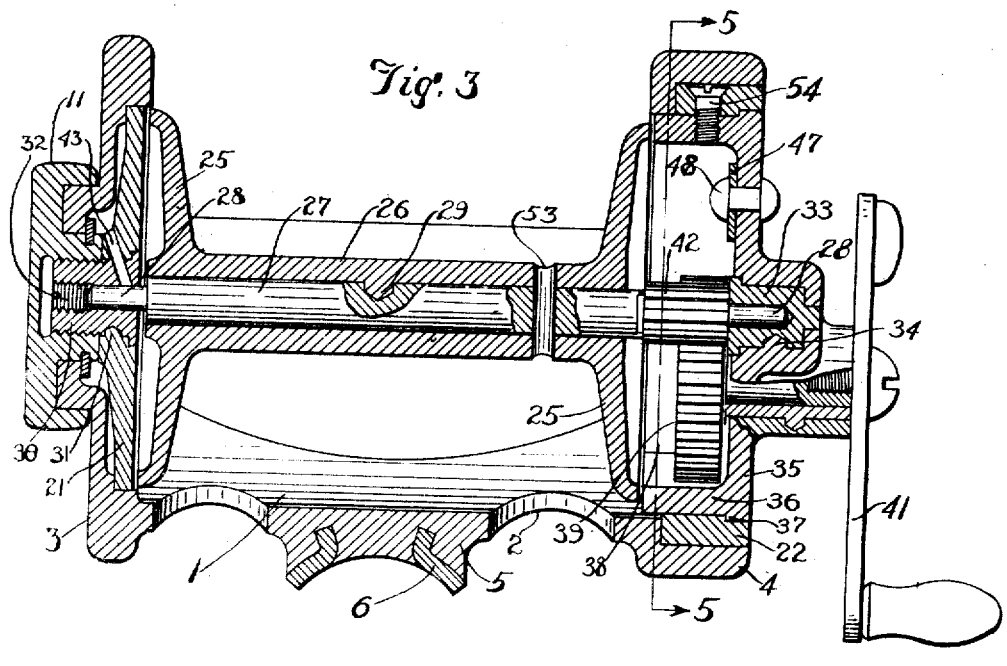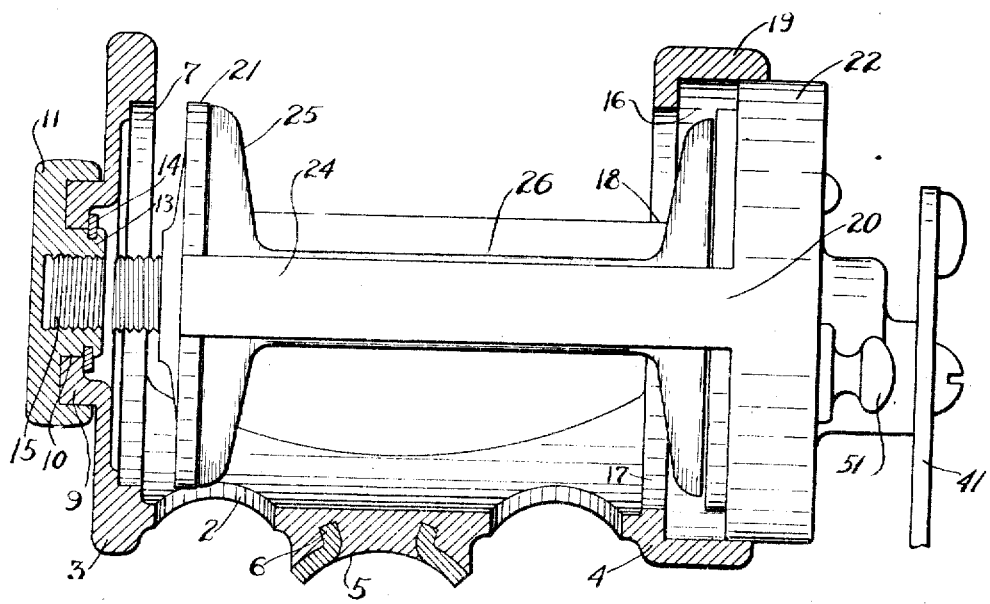

June 26, 1923.

F. M. CASE

FISHING REEL

Filed April 29, 1920

1,460,151

3 Sheets-Sheet 3

INVENTOR
Francis M. Case
BY
Brockett & Hyde
ATTORNEYS

Patented June 26, 1923.

1,460,151

UNITED STATES PATENT OFFICE.

FRANCIS M. CASE, OF CLEVELAND, OHIO, ASSIGNOR TO THE ENTERPRISE MANUFACTURING COMPANY, OF AKRON, OHIO, A CORPORATION OF OHIO.

FISHING REEL.

Application filed April 29, 1920. Serial No. 377,654.

*To all whom it may concern:*

Be it known that I, FRANCIS M. CASE, a citizen of the United States, residing at Cleveland, in the county of Cuyahoga and State of Ohio, have invented certain new and useful Improvements in Fishing Reels, of which the following is a specification.

This invention relates to fishing reels. The object of the invention is to provide an improved fishing reel which is of simple construction and which can be made at low cost. More particularly the object of the invention is to provide a fishing reel, the most important parts of which are of such form as will enable them to be made by die casting operations, thereby doing away with accurate finishing operations usually required in reels of this character.

A further object of the invention is to provide a reel embodying a frame unit which serves as the support for a unit including the spool and other working parts, said spool unit being bodily removable from the frame, thereby enabling the working parts to be inspected or repaired without entirely disassembling the parts.

A further object of the invention is to provide a reel including frame and spool units connected by a single screw or other attaching device, so that the two can be connected or disconnected quickly and by a single operation.

A further object of the invention is to provide a reel having spool and frame units and oiling and lubricating means for the working parts capable of being exposed for operation by simple detachment of the two units.

A further object of the invention is to provide a reel of this general character embodying operating gearing and a click, the parts of which can be readily lubricated, oiled or repaired when necessary.

Further objects of the invention are in part obvious and in part will appear more in detail hereinafter.

Figure 1:
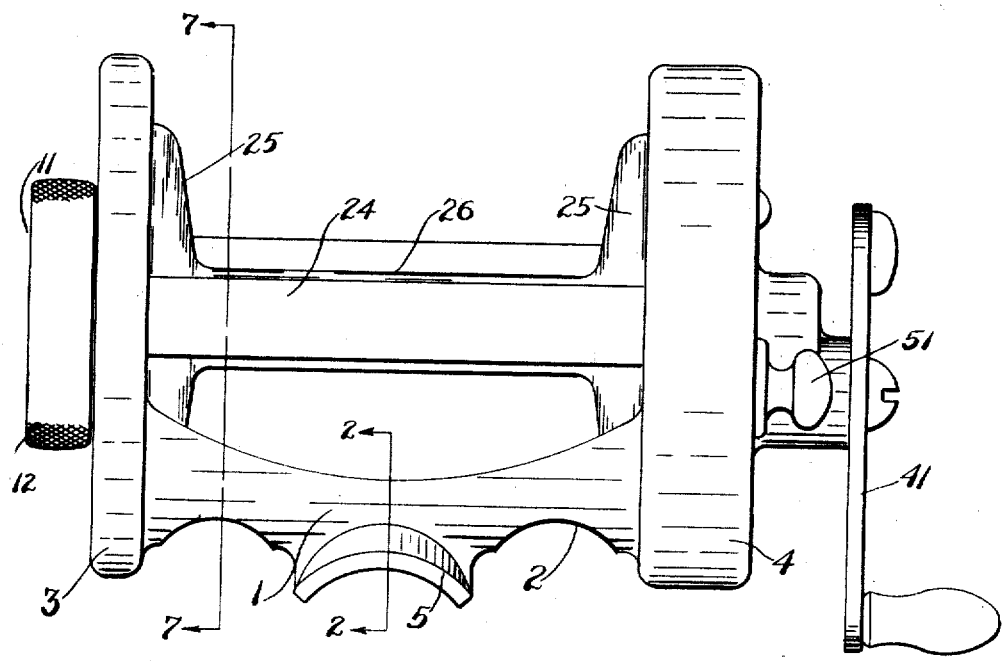
Figure 2:
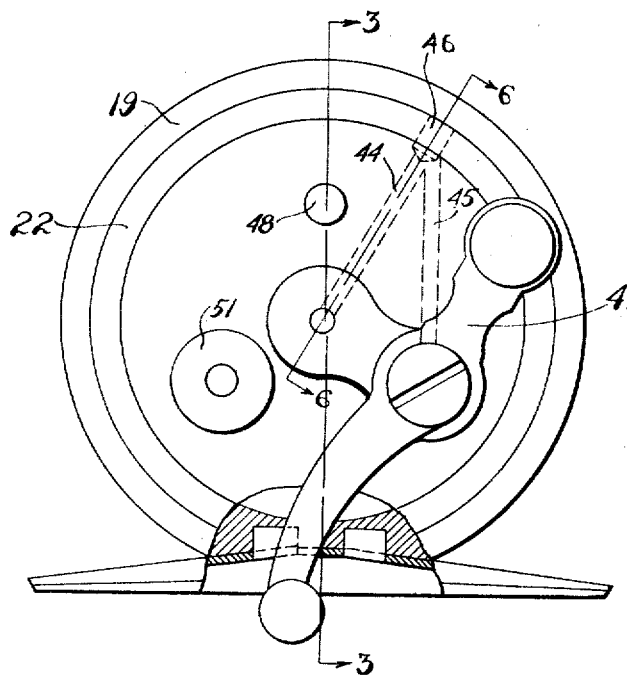
Figure 5:
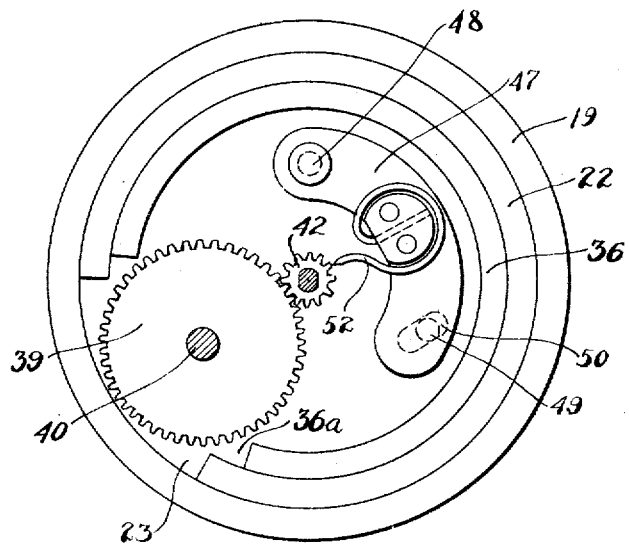
Figure 6:
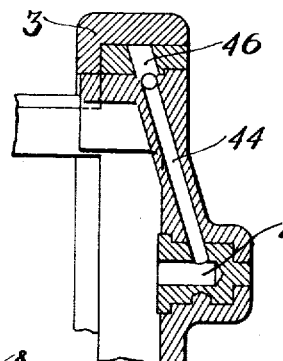
Figure 7:
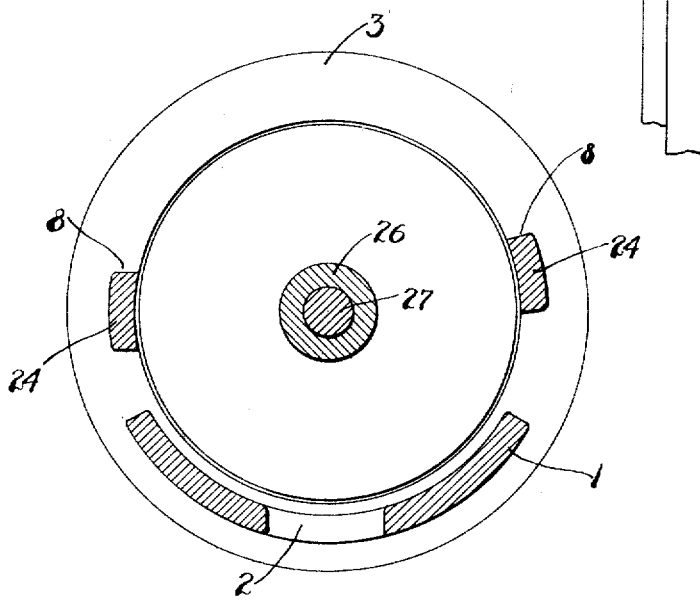

In the drawings, which represent one suitable embodiment of the invention, Fig. 1 is a front elevation; Fig. 2 is a side view from the right in Fig. 1, parts being broken away and in section on the line 2—2, Fig. 1; Fig. 3 is a sectional elevation on substantially the line 3—3, Fig. 2, the parts being shown in assembled position; Fig. 4 is a similar view, the spool unit being in elevation, and showing how the two units are detached; Fig. 5 is a sectional elevation on the line 5—5, Fig. 3; Fig. 6 is a detail section on the line 6—6, Fig. 2; and Fig. 7 is a sectional elevation on the line 7—7, Fig. 1.

The reel shown in the drawings comprises two units, to wit, a frame unit or main frame capable of attachment to or detachment from the fishing rod, and a spool unit which includes a supplemental frame, the rotating spool and the operating parts therefor. These units will be described separately.

The frame unit includes a base 1 which may be provided with openings 2 for lightness, said base at one end being provided with a practically solid head 3 and at its opposite end with a ring like head 4. The base is also provided with a foot plate 5 of ordinary form for attachment to the the fishing rod. This foot plate may be an integral part of the base or may be a separate part secured thereto by screws in any suitable manner. In the drawings said foot plate is a separate part having a series, four being shown, of tongs 6 formed thereon and embedded by the moulding operation in the casting which forms the frame member. The end head 3 has a central circular cavity 7 forming a seat to receive one end of the spool unit, said recess having two side recesses 8. The cylindrical wall of cavity 7 forms a guide for the head of the spool frame in moving along said cavity to clamped position against the annular shoulder at the end of said cavity. At its end the head is provided with a boss 9 having a central opening 10. On said boss is a cap 11, the periphery of which may be milled or otherwise roughened as indicated at 12, to enable it to be readily turned by the finger. This cap has an inwardly extending boss or sleeve portion 13 having an annular groove to receive a washer 14 for securing it rotatably, but preferably non-removably to the flange of the boss 9. The cap 11 is also provided with a threaded central opening 15 to receive a threaded portion of the spool unit frame and serves as the means for securing or locking together the two frame units by a longitudinal or relative telescoping clamping action which seats the heads of the spool unit on the shoulders of the heads of the frame unit and provides a firm or solid connection without lost motion or play of the parts.

The head 4 of the frame unit has its central portion cut away to form an opening 16 provided with an inwardly extending flange 17 having notches or recesses 18 therein. The outer portion of member 4 is extended to form a cylindrical wall 19 which serves to enclose or surround one head of the spool unit and not only protect the same but also close the lubricating openings therein, as will appear. The inner cylindrical surface of wall 19 forms a guide for the head of the spool unit in moving to its seat on the shoulder of flange 17 by the clamping effect of the cap 11. This seat for that head of the spool unit shown at the right in Fig. 3 is of larger diameter than the seat for the other head of the spool unit so that said spool unit can be assembled and disassembled with the main frame by relative telescoping movement.

As will be observed, the frame unit comprises two, and at the most, three separate members, disregarding the washer 14. One member is the cap 11 which can be either turned or die cast and threaded. A second member is the frame consisting of the base 1 and end heads 3 and 4 which can be formed as a die casting without expensive finishing operations. The foot plate 5 may be a part of the frame but in some cases will be a separate member, and even then may be secured to the frame by the die casing or forming operation therefor. These die castings, as well as the die castings for other parts of the reel may be made of aluminum or an aluminum composition, or of any other suitable metal.

The spool unit comprises a supplemental frame 20 provided at one end with a practically solid end head 21 of circular plate form and at its opposite end with a ring-like member 22 having an opening 23 therein, Said head 21 and the ring 22 are connected by two longitudinally extending bars 24 which are on opposite sides of the axis but are shown as not exactly diametrically opposite each other, as will appear from Fig. 7, although they may be diametrically opposite, if desired. This frame member can be made as a single casting. When the parts are assembled the head 21 lies in the cavity 7, the ring 22 is surrounded by the frame portion 19 and the bars 24 lie in the recesses 8 and 18. An irregular relation of the bars 24 to the central axis is desirable because it insures insertion of the spool unit into the frame unit in the proper position and avoids accidental inversion of the spool unit in the frame, although such relation is not essential, as before stated. These bars 24 not only serve as longitudinal braces rigidly connecting the end heads of member 20, but also in the assembled reel constitute the pillars over which the fishing line travels in being wound upon and unwound from the spool.

The spool is of common form having end heads 25 connected by a sleeve portion 26. The heads and sleeve are connected to rotate with a central spindle 27 either by being made integral therewith or by securely fastening the spool member and spindle to rotate together. As the spindle has bearing portions 28 it is usually made of steel and may therefore be provided in one side with a recess 29 to receve a portion of the metal of the spool, so that said spindle can be cast into and form a practically integral part of the spool. At one end of the spool the bearing portion 28 rotates in a threaded member 30 which may be made of bronze or other different from the steel of the bearing portion 28, and which is secured non-rotatably in the end head 21 of the spool frame member. Member 30 may be cast into said end head by providing it with a recess 31 to receive a portion of the metal thereof. Its threads enter the threaded opening 15 in the cap 11 so that by screwing up said cap the spool unit is drawn into and held tightly to its seat in the frame. Member 30 may also have a threaded opening to receive an adjusting screw 32 for taking up any end play of the spool member, and which serves as an end bearing.

The bearing portion 28 at the opposite end of the spool enters a bearing member 33 suitably secured, such as by the cast projection 34, to a circular end head or gear box 35, having a sleeve portion 36 designed to enter and fit within the ring 22 of the spool frame member 20 and to also engage and fit within the flange 17 of the outer frame member, so that said end head 35 seats on the heads 22 and 4 of the main and supplemental frame members. Said end head 35 is secured to the ring 22 by one or a plurality of screws 54 and is provided with a recess 36* lying opposite or in registry with the recess 23.

Members 22 and 35 are preferably also provided with interlocking shoulders or seat portions 37 (Fig. 3) which locate these parts longitudinally of the axis relative to each other and properly space the end of the flanges from the spool head 25 to avoid interfering friction. This arrangement produces a fairly large cavity 38 surrounded by the flange 36 of the gear box and lying between the fixed head 35 and the rotating spool head 25. In said cavity is located the operating mechanism for the reel. This may be of any suitable construction, depending upon the particular use to which it is put and the functions or results which it is to perform. The particular reel shown in the drawings is provided with a simple driving mechanism comprising a relatively large gear 39 carried upon one end of a shaft 40, provided on its outer end with an operating handle 41. Gear 39 meshes with a gear 42 fixed to rotate upon the spool shaft 27 and is exposed through the openings 23, 36ª so that lubricant may be readily applied thereto.

It will be observed that the inter-engaging shoulders between the heads of the two frame members and between the head of the frame of the spool unit and gear box or head 35 form stops which limit relative longitudinal or telescoping motion between the three parts when the parts are finally locked together by the clamping effect of cap 11. These shoulders positively insure definite location of the parts relative to each other.

The spool unit, comprising the supplemental frame, the rotating spool therein and the driving mechanism therefor, is removable as an entirety from the main fixed or stationary frame without disassembling the parts of the spool unit. Connection of the two units to each other is secured entirely by the cap 11 and the threaded member 30. When these two parts are screwed together, as in Fig. 3, the reel is completely assembled and the spool can be operated therein, and at the same time all of the working parts are enclosed and protected. By unscrewing the cap 11, as shown in Fig. 4, the spool unit is forced longitudinally out of the frame unit and can be removed therefrom. Such removal exposes the screws 54 which can be taken out to permit the gear box 35 and its associated parts to be removed. The spool heads 25 are of slightly smaller diameter than the opening within the ring 22. Consequently removal of the head 35 enables the spool to be taken out of the spool frame.

Suitable means is preferably also provided for lubricating the rotating parts. At one end of the spool the frame head 21 and member 30 are bored out to form an inclined oiling channel 43 extending to the shaft bearing. At the opposite end of the spool oiling channels 44 and 45 are bored out from a cavity 46 to the bearings for the spool shaft 27 and opearting gear shaft 40, as shown in Fig. 2. When the parts are all assembled in operating relation, as in Fig. 3, the outer ends of the oiling channels and the openings 23, 36ª are not only concealed but are protected from the entrance of dirt. The outer end of channel 43 is covered by the fixed end head 3. The cavity 46 at the outer ends of the channels 44, 45, is in the ring member 22, and said channels extend down through the metal of end head 35. Consequently these oiling channels and the openings 23, 36ª are covered and closed by the end ring head 4. Both sets of oiling channels are exposed by withdrawing the spool unit from the frame unit, as before described.

In the chamber 38 is also located a click, to wit, some suitable mechanism for producing a clicking noise as an alarm when the reel is rotated by unwinding action of its spool. Any suitable construction may be employed for this purpose. As shown, said click embodies an arm 47 of plate form pivoted on a pin 48 in the end head 35. Said arm is curved around the central axis, as shown in Fig. 5, and near its opposite end is provided with a pin 49 passing through an elongated slot 50 in the head 35, and provided on its outer end with an operating button 51. Between its ends the arm 47 has suitably secured thereto a spring member 52 whose inner end extends radially to the central axis.

Fig. 5 shows the click in inoperative position. Pin 49 has been moved to or near to the outer end of the slot 50 so that the rounded or pointed end of the member 52 is free of engagement with the teeth of the pinion 42 opposite to the driving gear 39. The click is rendered effective by moving the pin 49 inwardly to engage the click with the gear teeth, whereupon as the spool rotates the member 52 wipes from tooth to tooth of the pinion 42 and produces a clicking and ratcheting sound.

53 represents a diametrical opening through the spool shaft for securement of the fishing line thereto.

The reel described is of simple construction and most of its parts can be made by die casting operations with a minimum amount of machine finishing. The parts can be readily assembled or disassembled without the use of special tools and by an unskilled person. All parts are protected from the entrance of dirt, water and the like, and at the same time the operating mechanism can be easily lubricated.

What I claim is:

1. A fishing reel, comprising a frame unit adapted for attachment to a fishing rod, a spool and operating devices therefor removable as a unit from said frame unit, said spool unit having lubricating openings closed by the frame unit when the units are in associated relation and exposed when said units are separated.

2. A fishing reel, comprising a frame unit adapted for attachment to a fishing rod, a spool unit removable from said frame unit and provided with end heads carrying a spool, one of said end heads carrying operating devices for said spool, the end heads of said spool unit having lubricating openings closed by the frame unit when the units are in associated relation and exposed when said units are separated.

3. A fishing reel, comprising a frame unit adapted for attachment to a fishing rod, a spool unit removable from said frame unit, said spool unit being provided with end heads, a spool journalled in said end heads, one of said end heads having a detachable portion carrying operating devices for said spool, said heads being provided with lubricating openings and channels extending through said detachable head portion, said lubricating openings being closed by the frame unit when the units are in associated relation and exposed when said units are separated.

4. A fishing reel, comprising a main frame, a supplemental frame therein, and a spool in said supplemental frame, said supplemental frame including integrally connected end heads and connecting pillars.

5. A fishing reel, including a main frame, a spool unit connected thereto, said spool unit including a spool, a supplemental frame including a gear box and longitudinal pillars, and operating gearing for said spool located in said gear box, said supplemental frame having lubricating openings closed by the main frame when the two frames are assembled.

6. A fishing reel, including two associated cast metal frames, each frame having integrally connected end heads and longitudinally extending connecting members, one frame being adapted for connection to a fishing rod and the other frame being adapted to receive the operating parts of the reel.

7. A fishing reel, comprising a frame unit having end members and rod attaching means, a spool unit adapted for normal operation of its parts without disconnection thereof when said two units are disassembled, said spool unit including a spool, a supporting frame therefor, and spool operating mechanism, and means for rigidly clamping said units together to prevent lost motion therebetween.

8. A fishing reel, comprising a frame unit having end members and rod attaching means, a spool unit adapted for normal operation of its parts without disconnection thereof when said two units are disassembled, said spool unit including a spool, a supporting frame therefor, and spool operating mechanism and means for rigidly clamping said units together to prevent lost motion therebetween, said units being arranged for assembly by relative telescoping movement and being provided with stop means for limiting such movement.

9. A fishing reel, comprising a frame unit having end members and rod attaching means, a spool unit adapted for normal operation of its parts without disconnection thereof when said two units are disassembled, said spool unit including a spool, a supporting frame therefor, and spool operating mechanism, means for rigidly clamping said units together to prevent lost motion therebetween, said units being arranged for assembly by relative telescoping movement and being provided with stop means for limiting such movement, and means for clamping said units together by relative telescoping movement.

10. A fishing reel, comprising a frame unit having end members and rod attaching means, a spool unit adapted for normal operation of its parts without disconnection thereof when said two units are disassembled, said spool unit including a spool, a supporting frame therefor, and spool operating mechanism, means for rigidly clamping said units together to prevent lost motion therebetween, said units being arranged for assembly by relative telescoping movement, and means for clamping said units together by relative telescoping movement, said clamping means being permanently mounted for clamping movement only upon one of the end members of said frame unit.

11. A fishing reel, comprising a frame unit having end members and rod attaching means, a spool unit adapted for normal operation of its parts without disconnection thereof when said two units are disassembled, said spool unit including a spool, a supporting frame therefor, and spool operating mechanism means for rigidly clamping said units together to prevent lost motion therebetween, said units being arranged for assembly by relative telescoping movement and being provided with stop means for limiting such movement, and means for clamping said units together by relative telescoping movement, said clamping means being permanently mounted for rotative movement only upon one of the end members of said frame unit.

12. A fishing reel, comprising a main frame unit having head members one of which is open, said members being provided with seat portions of different diameters, the open head seat portion being the larger, and a spool unit adapted for insertion endwise into said main frame through said open head member and including a supplemental frame having seat portions of different diameters to engage the seat portions of said main frame unit.

13. A fishing reel, comprising a main frame unit having head members one of which is open, said members being provided with seat portions of different diameters, the open head seat portion being the larger, a spool unit adapted for insertion endwise into said main frame through said open head member and including a supplemental frame having seat portions of different diameters to engage the seat portions of said main frame unit, and means for clamping the seat portions of said frames together by relative endwise movement thereof.

14. A fishing reel, comprising a main frame unit having head members one of which is open, said members being provided with seat portions of different diameters, the open head seat portion being the larger, a spool unit adapted for insertion endwise into said main frame through said open head member and including a supplemental frame having seat portions of different diameters to engage the seat portions of said main frame unit, and means for clamping the seat portions of said frames together by relative endwise movement thereof and comprising a threaded member rotatably connected to one of said frame members and engaging a threaded portion of the other frame member.

15. A fishing reel, comprising a main frame unit having head members one of which is open, said members being provided with seat portions of different diameters, the open head seat portion being the larger, a spool unit adapted for insertion endwise into said main frame through said open head member and including a supplemental frame having seat portions of different diameters to engage the seat portions of said main frame unit, and means for clamping the seat portions of said frames together by relative endwise movement thereof and comprising a threaded member rotatably connected to one of said frame members and engaging a threaded portion of the other frame member, said threaded member being arranged by rotation in one direction to clamp the parts together and by rotation in the opposite direction to positively force them apart.

16. A fishing reel, comprising telescopically related main and supplemental frame members, the main frame member having seats therein, the supplemental frame member nesting within the main frame member and engaging the seats thereof and being also provided with a seat, and spool carrying means nesting within the supplemental frame member and engaging the seat thereof.

17. A fishing reel, comprising telescopically related main and supplemental frame members, the main frame member having seats therein, the supplemental frame member nesting within the main frame member and engaging the seats thereof and being also provided with a seat, spool carrying means nesting within the supplemental frame member and engaging the seat thereof, and means connecting the two frame members and adapted to rigidly clamp the several parts together in a manner to prevent lost motion therebetween.

18. A fishing reel, comprising telescopically related main frame, supplemental frame, and spool supporting members, means for limiting relative telescoping movement between said members, and means for preventing relative rotation between said members.

19. A fishing reel, comprising telescopically related main frame, supplemental frame, and spool supporting members, means for limiting relative telescoping movement between said members, means for preventing relative rotation between said members, and means for clamping said several members together by relative telescoping movement.

20. A fishing reel, comprising telescopically related main frame, supplemental frame, and spool carrying members, means carried by the main frame member for securing said two frame members together, and means between the supplemental frame member and spool supporting member for connecting them together.

21. A fishing reel, comprising telescopically related main frame and supplemental frame members provided with surfaces for guiding them during telescoping movement, a head member for said supplemental frame member telescopically related thereto and provided with means engaging said two frame members for guiding it during telescoping movement, and a spool and operating mechanism therefor in said supplemental frame member.

22. A fishing reel, comprising a main frame provided with one end member having a seat portion and a guiding portion, and a second ring shaped end member provided with a seat portion and a guiding portion and an opening corresponding in dimension to the size of the first named guiding portion, a supplemental frame having seating and guiding portions for engaging the seat and guide portions of the main frame member and a cylindrical gear box guide and seat, a gear box engaging said last named guide and seat, and a spool and operating mechanism arranged in said supplemental frame and gear box.

23. A fishing reel, comprising a main frame having an annular shouldered head member, a supplemental frame extending through said annular head member and provided with a shouldered annular head member engaging the shoulder of the main frame head member, a head member within said supplemental frame head member and shouldered to engage the shoulder of the same, and a spool and operating mechanism therefor carried by said supplemental frame member and said third head member.

24. A fishing reel, comprising a main frame having an annular shouldered head member, a supplemental frame extending through said annular head member and provided with a shouldered annular head member engaging the shoulder of the main frame head member, a head member within said supplemental frame head member and shouldered to engage the shoulder of the same, and a spool and operating mechanism therefor carried by said supplemental frame member and said third head member, said two frame members at their opposite ends being provided with inter-engaging guiding portions.

25. A fishing reel, comprising a main frame having an annular shouldered head member, a supplemental frame extending through said annular head member and provided with a shouldered annular head member engaging the shoulder of the main frame head member, a head member within said supplemental frame head member and shouldered to engage the shoulder of the same, a spool and operating mechanism therefor carried by said supplemental frame member and said third head member, and means for clamping said parts together by relative endwise movement.

26. A fishing reel, comprising a main frame having an annular shouldered head member, a supplemental frame extending through said annular head member and provided with a shouldered annular head member engaging the shoulder of the main frame head member, a head member within said supplemental frame head member and shouldered to engage the shoulder of the same, a spool and operating mechanism therefor carried by said supplemental frame member and said third head member, said two frame members at their opposite ends being provided with inter-engaging guiding portions, and means for clamping said parts together by relative endwise movement.

In testimony whereof I affix my signature.

FRANCIS M. CASE.